July 4, 1961 G. T. LYON 2,991,085
CUTTING TOOL CHUCK
Filed July 19, 1960 2 Sheets-Sheet 1
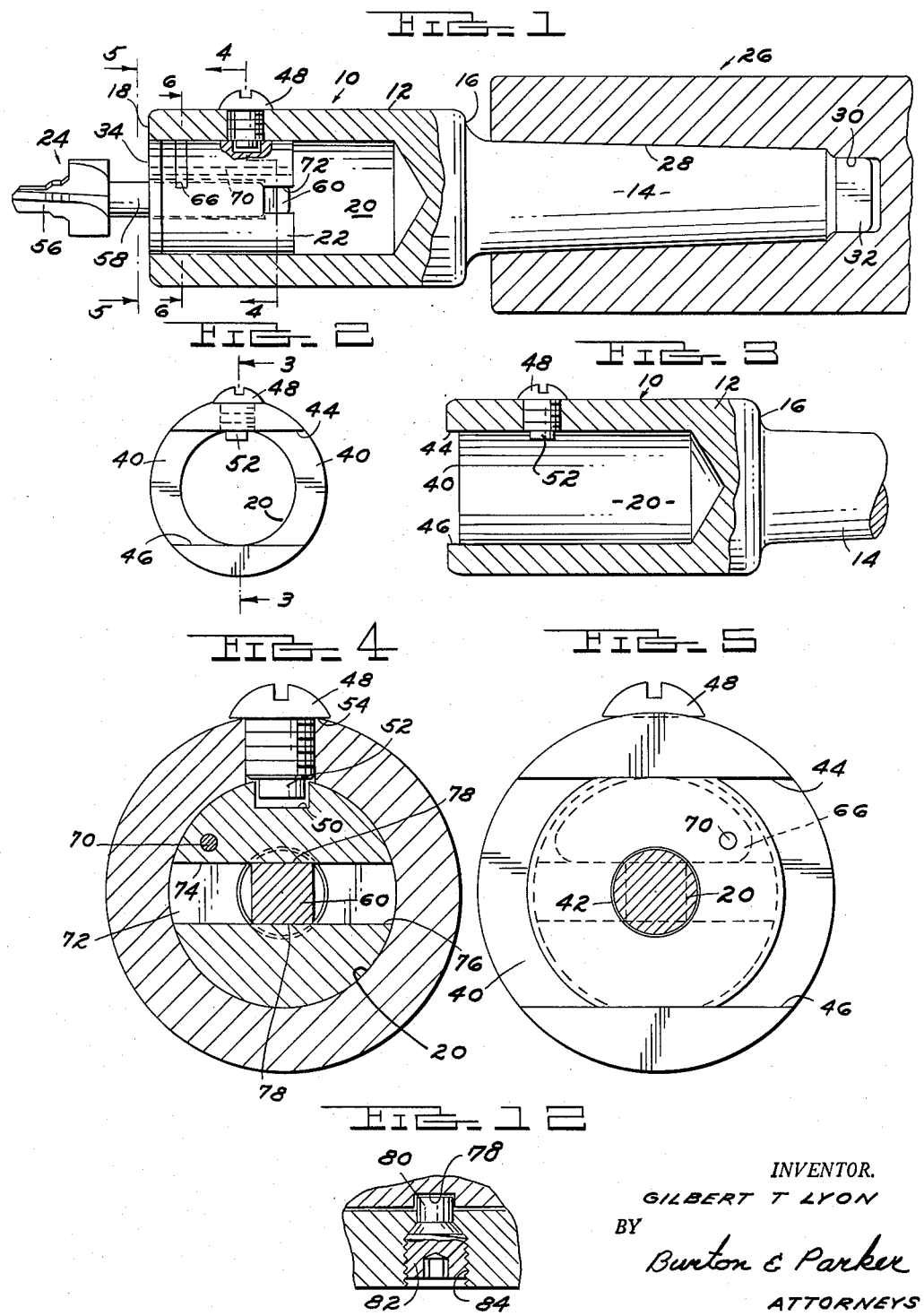
INVENTOR.
GILBERT T LYON
BY
Burton & Parker
ATTORNEYS July 4, 1961 G. T. LYON 2,991,085
CUTTING TOOL CHUCK
Filed July 19, 1960 2 Sheets-Sheet 2
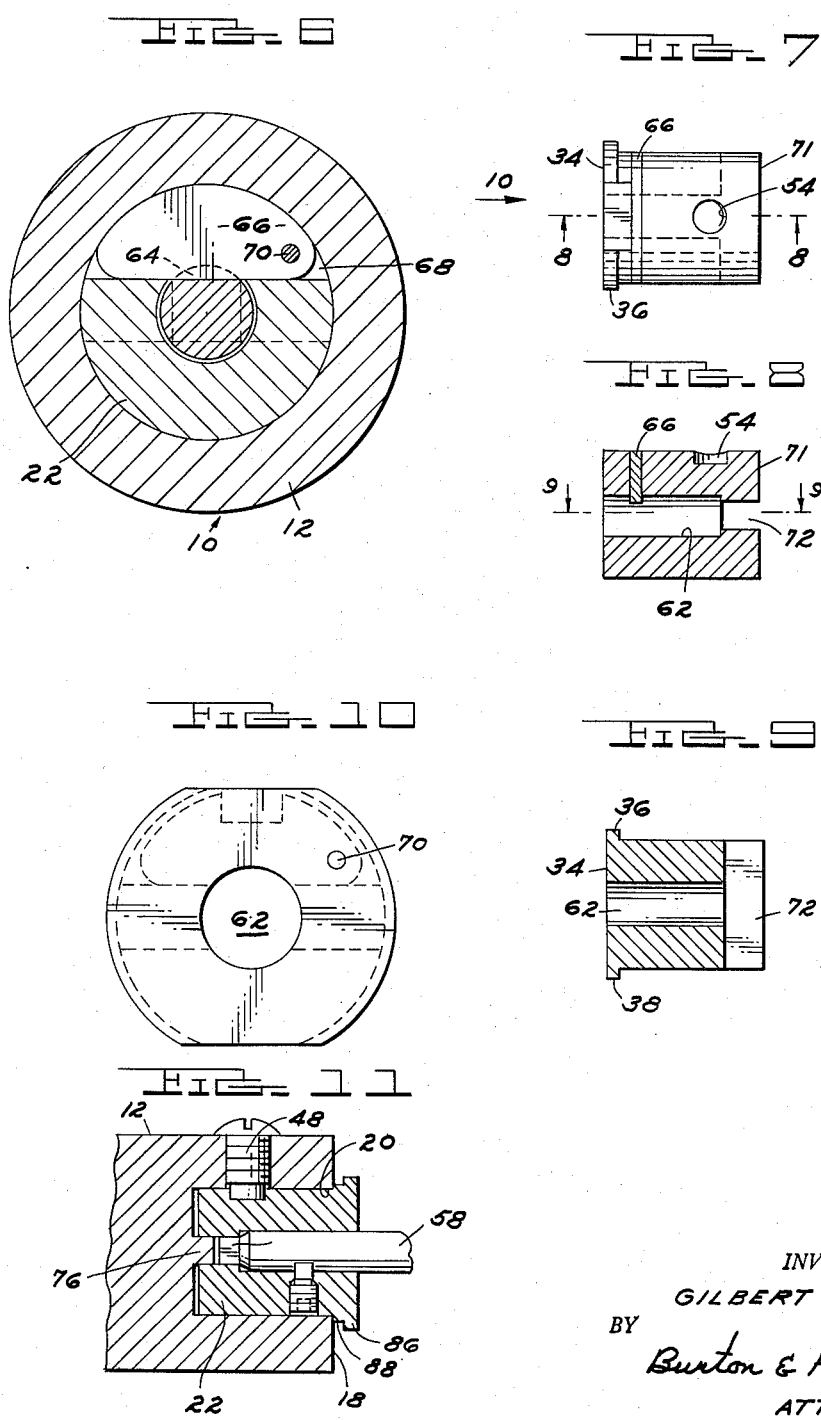
INVENTOR.
GILBERT T. LYON
BY
Burton & Parker
ATTORNEYS United States Patent Office 2,991,085
Patented July 4, 1961

2,991,085
CUTTING TOOL CHUCK
Gilbert T. Lyon, Royal Oak, Mich., assignor to L & L Manufacturing Company, Warren, Mich., a corporation of Michigan
Filed July 19, 1960, Ser. No. 43,786
10 Claims. (Cl. 279—16)

This invention relates to a drill chuck and the like, for floatingly carrying a self-centering type cutting tool.

Drill chuck, as used herein, refers to a chuck for holding a rotatable type of cutting tool such as, for example, a drill, counterbore, reamer, tap, and the like. This type of chuck can be stationary and it can be rotated on its axis.

In reaming, counterboring, tapping, and bottom drilling a hole in an article or work, the axis of the cutting tool must be coaxial with the axis of the hole in order to achieve high precision machining. With conventional drill chucks, the cutting tool is rigidly held to a fixed axis about which either the tool or the workpiece is rotated. With this type of chuck, accurate alignment of the cutting tool axis and the axis of the hole into which the cutting tool is entered can be a troublesome problem in high production work.

An object of this invention is to provide a new and improved drill chuck which enables the cutting tool to be self-centering under normal operative conditions.

A specific object of this invention is to provide a new and improved drill chuck which, under normal use conditions, permits free lateral movement within limits between the axis of the drill chuck and the axis of the cutting tool whereby the cutting tool is made self-centering.

Another object of this invention is to provide a new and improved drill chuck which, in addition to permitting the cutting tool held thereby to be self-centering, also has a simple, easily duplicated structure.

These and other objects which may appear as this specification proceeds are achieved by this invention which shall be described with reference to the specific embodiment thereof illustrated in the accompanying drawings.

In the drawings:

FIG. 1 is a longitudinal view of a preferred embodiment of the chuck of this invention in combination with a cutting tool and a spindle of a lathe, which view has been partially sectioned to reveal internal structure;

FIG. 2 is a front end view of the driver assembly of the chuck of FIG. 1 with the tool holder assembly removed therefrom;

FIG. 3 is a longitudinal sectional view of the driver assembly, which view has been taken as indicated generally by the sectioning plane 3—3 of FIG. 2;

FIG. 4 is a cross sectional view of the chuck of FIG. 1, which view has been taken as indicated by the sectioning planes 4—4 of FIG. 1;

FIG. 5 is a front end view of the chuck of FIG. 1, which view has been taken as indicated by the sectioning plane 5—5 of FIG. 1;

FIG. 6 is still another cross sectional view of the chuck of FIG. 1, which view has been taken as indicated by the sectioning plane 6—6 of FIG. 1;

FIG. 7 is a plan view of the tool holder assembly of the chuck of FIG. 1;

FIG. 8 is a longitudinal sectional view of the tool holder assembly, which view has been taken as indicated by the sectioning plane 8—8 of FIG. 7;

FIG. 9 is a longitudinally sectioned, top view of the tool holder member, which view has been taken as indicated by the sectioning plane 9—9 of FIG. 8;

FIG. 10 is a front end view of the tool holder assembly, which view has been taken as indicated generally by the sight direction arrow 10 of FIG. 7;

FIG. 11 is a fragmentary longitudinal section through an alternative form of the chuck; and FIG. 12 is a fragmentary detail of a portion of the structure shown in FIG. 11.

In the embodiment of the invention shown in FIGS. 1–10, inclusive, a drill chuck or the like comprises a body member 10 having a socket portion 12 and a coaxially arranged spindle portion 14 integral with the inner end 16 of the socket portion. Preferably the spindle and socket portions are formed of one piece of material. Through the outer end face 18 of the socket portion 12 opens a cylindrical socket 20. Received within the socket 20 is a cylindrical tool-holding block 22 within which is received a self-centering cutting tool 24 which may be a tap, reamer, counterboring drill, or the like. The block 22 is adapted to carry the cutting tool in such fashion that the tool will center itself as it moves through a workpiece following a pilot lead hole or the like provided therein.

The spindle 14 is adapted to be mounted in either a stationary or rotating part 26 of a machine tool. The machine tool part 26 may be internally provided with a spindle-receiving recess 28 complementing the shape of spindle 14 and terminating in a non-cylindrical or square recess 30 to cooperably receive a non-cylindrical or square end 32 on the spindle, to lock the spindle and part 26 against relative rotation.

The tool-holding block is preferably a slip fit within the socket 20. The outer end 34 of the block is provided with a pair of shoulders 36 and 38 at opposite extremities of the diameter of the block which are receivable within a cooperating slot 40 formed in the outer end face 18 of the socket portion 12 of the body member. The slot 40 is defined by opposed shoulders 44 and 46 which are formed in the end of the socket portion 12 by cutting the slot 40 in the end face 18 of a width corresponding to the diameter of socket 20. The shoulders 36 and 38 of the block cooperate with the shoulders 44 and 46 of the socket portion 12 to prevent relative rotation between the block and body member 10.

In order to hold the block 22 within socket 20, a detent in the form of a screw 48 is provided as shown in various figures of the drawings. The cylindrical surface of the block is provided with a recess 50 within which the bullnose end portion 52 of the screw is received when the screw is tightened to a seated position in the socket portion 12 of the body member. The underside 54 of the head of screw 48 seats upon the outer surface of socket portion 12 of the body member when the screw is tightened down into the body member. The bullnose end of the screw prevents withdrawal of the block 22 from the socket 20.

The tool shown in FIG. 1 is intended to be merely one example of a cutting tool that might be used with the chuck shown herein. The cutting tool is provided with a self-centering cutting end 56 and a shank 58. The shank is preferably cylindrical and at its inner end is provided with a non-cylindrical or square portion 60. The block 22 is provided with a cylindrical tool shank-receiving bore 62 extending coaxially of the block and terminating at its inner end in a non-cylindrical recess 72 shaped to receive the non-cylindrical end portion 60 of the tool shank to cooperate with portion 60 to lock the shank and block against relative rotation. The bore 62 of the block is sufficiently oversize the diameter of shank 58, and the dimensions of recess 72 are such in relation to the dimensions of end portion 60 of the tool shank, that the tool is allowed lateral play within the block.

Intermediate opposite ends of the shank 58, it is relieved at 64 to receive a detent in the form of a pivoted latch 66 to prevent unintentional withdrawal of the tool from the block. The latch may be pivoted within a suitable slot 68 provided in the block with a pin 70 extending through the latch adjacent one end thereof as shown in the various figures of the drawing. It will be noted that when the block is in the socket 20 the latch 66 is held in the relief 64 so that the tool cannot be withdrawn from the block. The relief or slot 64 is sufficiently oversize the thickness and depth of projection of the latch 66 thereinto that the tool does not bind on the latch during lateral play of the tool in the block.

The inner end of the bore 62 of the block is shaped to receive the non-cylindrical end 60 of the shank of the tool by providing in the inner end face 71 of the block a transversely extending slot 72 having a width slightly oversize the width of the non-cylindrical end 60 of the shank and cut to a depth sufficient so that the bottom of the slot 72 opens into the bore 62 of the block. The edges of slot 72 are defined by opposed shoulders 74 and 76 which cooperate with the flats 78 of the non-cylindrical or squared end 60 of the tool shank to prevent relative rotation between the block 22 and the tool. The distance between shoulders 74 and 76 is such, in relation to the distance between the flats 78 of the end portion 60 of the tool shank, that the tool is allowed to shift laterally within the bore 62 of the block to center itself as it feeds into a workpiece.

In forming the block 22, it will be noted that no intricate or complex machining operations are involved. The bore 62 may be drilled out and reamed, if desired, to a depth shown in FIGS. 7, 8, and 9, and thereafter the slot 72 may be cut in the inner end 71 of the block.

In the form of the chuck shown in FIGS. 1–10, inclusive, it will be noted that the block carrying the tool is supported in the socket portion 12 with relative rotation between the socket portion and block prevented by virtue of the cooperating shoulders 36 and 38, and 44 and 46. The tool is received in the block and relative rotation between the tool and the block prevented by the cooperating flats or shoulder-like portions 78 of the tool shank end 60 and the shoulders 74 and 76 of slots 72 at the inner end of the block. The block is retained in the socket by the detent 48, and the tool is retained in the bore of the block by the detent or latch plate 66. It will be apparent that as the self-centering cutting end 56 of the tool 24 follows a pilot hole or lead hole in a workpiece, the tool will be allowed to shift laterally and center itself while at the same time relative rotation between the tool and the body member 10 will be prevented so that the tool will float within the chuck.

In the modification shown in FIGS. 11 and 12, relative rotation between the block and socket portion of the chuck is prevented by a tongue or rib 76 formed integrally with the socket portion 12 at the bottom of the socket 20. The slot 72 at the inner end of the block is cut deeper than shown in FIGS. 7, 8, and 9 to receive the rib 76 as well as the non-cylindrical or squared end 60 of the tool shank 58.

The tool shank is provided with a relief 76 within which in loose fit is received the bullnose end 80 of a socket screw or the like 82. The socket screw is threaded into the wall of the block 22 to bottom against the bottom of the threaded portion of the opening 84 within which the screw is received. The clearance between the relief 78 and the sides of the bullnose end 80 of the screw are sufficient to allow lateral play of the tool within the block. The block is retained in the socket in a fashion similar to that heretofore described.

The outer end of the block may be provided, as shown in FIG. 11, with a pair of stepped shoulders 86 and 88, the latter abutting the end face 18 of the socket portion 12. The socket portion 12 is not provided with the slot 40 described in connection with the FIGS. 1–10 embodiment. The shoulder 86 allows for the insertion of a screwdriver or other tool between the end face 18 of socket portion 12 and shoulder 86 for ready removal of the block from the socket portion 12 on backing off of detent 48.

In this embodiment it will be noted that the tool is held against rotation relative to the socket portion 12 in the area of the rib 76 which also prevents relative rotation between the block and the socket portion 12 thereby relieving the block of the strain which will be imposed upon it in the FIGS. 1–10 embodiment.

What I claim is:

1. A drill chuck for floatingly carrying a cutting tool having a self-centering cutting end and a shank comprising: a body member for mounting on a machine tool, said body member having a socket portion provided with a cylindrical socket opening through an end face of the member and extending inwardly thereof, a cylindrical tool-holding block slidably receivable within said socket, means on said body member engageable with said block to prevent withdrawal of the block from the socket and prevent relative rotation between the block and body member, said block provided with a cylindrical tool shank-receiving bore extending coaxially of the block and terminating at the inner end in a non-cylindrical recess engageable with a non-cylindrical end of the shank of the cutting tool received in the block bore to provide a driving connection between the tool and block, said bore having a diameter oversize the diameter of the tool shank received therein to allow lateral play between the block and tool, and means on the block engageable with the tool shank to prevent withdrawal of the tool from the block.

2. A drill chuck for floatingly carrying a cutting tool having a self-centering cutting end and a shank comprising: a body member for mounting on a machine tool, said body member having a socket portion provided with a cylindrical socket opening through an end face of the member and extending inwardly thereof, a cylindrical tool-holding block slidably receivable within said socket, means on said body member engageable with said block to prevent withdrawal of the block from said socket, said socket portion provided with a shoulder, said block provided with a shoulder cooperating with the shoulder of the socket portion to prevent relative rotation between the block and socket portion, said block provided with a cylindrical tool shank-receiving bore extending coaxially of the block and terminating at the inner end in a non-cylindrical recess engageable with a non-cylindrical end of the shank of the cutting tool received in the block bore to provide a driving connection between the tool and block, said bore having a diameter oversize the diameter of the tool shank received therein to allow lateral play between the block and tool, and means on the block engageable with the tool shank to prevent withdrawal of the tool from the block.

3. The invention as defined in claim 2 characterized in that the shoulder of said socket portion is at the end face of the socket portion and the shoulder of said block is at the outer end of the block when the block is received in the socket.

4. The invention as defined in claim 2 characterized in that said shoulder of the socket portion is provided within the socket adjacent the inner end thereof and the shoulder of the block is at the inner end thereof when the block is received in the socket.

5. The invention as defined in claim 4 characterized in that the non-cylindrical recess at the inner end of the bore in the block is adjacent the shoulder at the inner end of the block.

6. A drill chuck for floatingly carrying a cutting tool having a self-centering cutting end and a shank comprising: a body member for mounting on a machine tool, said body member having a socket portion provided with a cylindrical socket opening through an end face of the member and extending inwardly thereof, a cylindrical tool-holding block slidably receivable within said socket, means on said body member engageable with said block to prevent withdrawal of the block from said socket, a rib in said socket integral with the said body, said block provided with a slot cooperable with said rib to prevent relative rotation between the block and body member, said block provided with a cylindrical tool shank-receiving bore extending coaxially of the block and terminating at the inner end in a non-cylindrical recess engageable with a non-cylindrical end of the shank of the cutting tool received in the block bore to provide a driving connection between the tool and block, said bore having a diameter oversize the diameter of the tool shank received therein to allow lateral play between the block and tool, and means on the block engageable with the tool shank to prevent withdrawal of the tool from the block.

7. The invention as defined in claim 1 characterized in that said block is a slip fit within the socket and said means for preventing withdrawal and relative rotation between the block and body member comprise a releasable detent on the body and a cooperable recess on the block for preventing withdrawal of the block from the socket, and a rib within the socket integral with the body member and extending into a cooperating slot in the block for preventing relative rotation between the block and body member.

8. The invention defined by claim 1 characterized in that said means for preventing withdrawal of the block from the socket and relative rotation between the block and body member includes a rib within the socket at the inner end thereof integral with the body member and extending transversely of the socket, and said block has an outer end face through which the tool shank-receiving bore opens and an inner end face provided with a transverse slot within which said rib is received when the block is disposed within the socket, with said rib and slot cooperably preventing relative rotation between the block and body member.

9. A drill chuck for floatingly carrying a cutting tool having a self-centering cutting end and a shank comprising: a body member for mounting on a machine tool, said body member having a socket portion provided with a cylindrical socket opening through an end face of the member and extending inwardly thereof, a cylindrical tool-holding block slidably receivable within said socket, a detent on the body member shiftable into and out of the socket, a recess in the cylindrical surface of the block within which said detent is receivable to prevent withdrawal of the block from the socket, one end of said block provided with a shoulder extending transversely of the axis of the block, said body member adjacent one end of the socket provided with a shoulder extending transversely of the axis of the socket and cooperable with the shoulder on the block to prevent relative rotation between the block and body member when the block is received in the socket, said block provided with a cylindrical tool shank-receiving bore extending coaxially of the block and terminating at the inner end in a noncylindrical recess engageable with a non-cylindrical end of the shank of the cutting tool received in the bore to provide a driving connection between the tool and block, said bore having a diameter oversize the diameter of a tool shank received therein to allow lateral play between the block and tool, and means on the block engageable with the tool to prevent withdrawal of the tool from the block.

10. A drill chuck for floatingly carrying a cutting tool having a self-centering cutting end and a shank comprising: a body member for mounting on a machine tool, said body member having a socket portion provided with a cylindrical socket opening through an end face of the member and extending inwardly thereof, a cylindrical tool-holding block slidably receivable within said socket, means on said body member releasably engageable with the block to prevent unintentional withdrawal of the block from said socket, said block having outer and inner end faces and provided with a cylindrical tool shank-receiving bore opening through the outer end face and extending coaxially inwardly of the block and terminating in a non-cylindrical recess at the inner end of the bore within which a non-cylindrical end of the tool shank may be received to drivingly connect the block and cutting tool to prevent relative rotation therebetween, the inner end face of said block provided with a transversely extending slot, the bottom of the socket provided with a transverse rib integral with the body member and receivable in said slot to drivingly connect the block and body and prevent relative rotation therebetween, said cylindrical shank-receiving bore having a diameter greater than the diameter of the tool shank received therein to allow lateral play of the tool within the bore, and means on the block engageable with the tool to prevent withdrawal of the tool from the block.

References Cited in the file of this patent

UNITED STATES PATENTS

| | | |
|---|---|---|
| 1,041,015 | Butler | Oct. 15, 1912 |
| 1,645,948 | Galloway | Oct. 18, 1927 |
| 1,763,717 | Morgan | June 17, 1930 |